Jan. 17, 1933.  A. DEL VALLE Y DESVERNINE  1,894,737
SIGNALING DEVICE FOR VEHICLES
Filed April 18, 1930   3 Sheets-Sheet 3
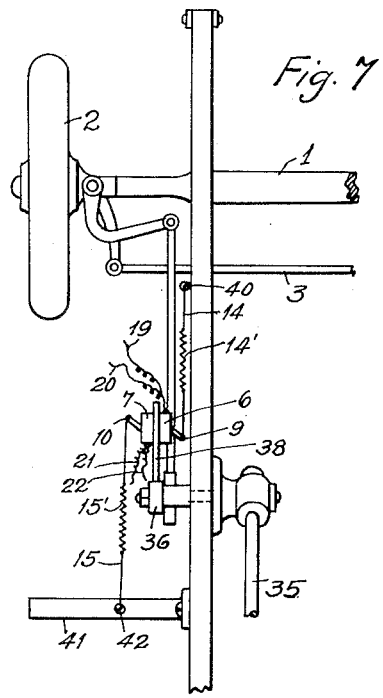
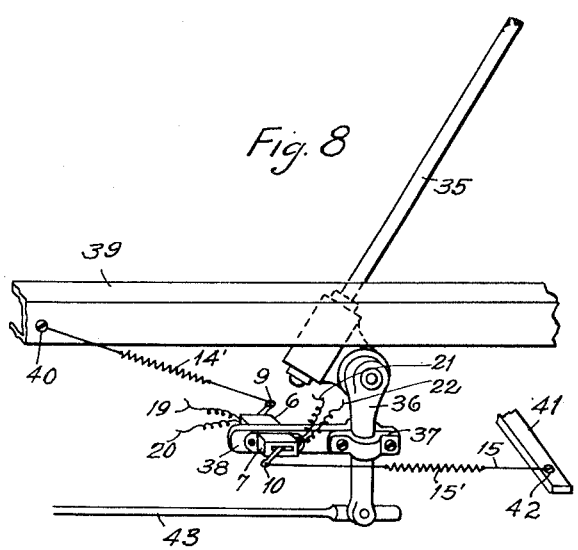
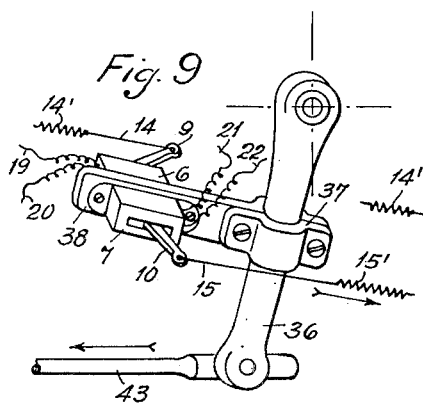
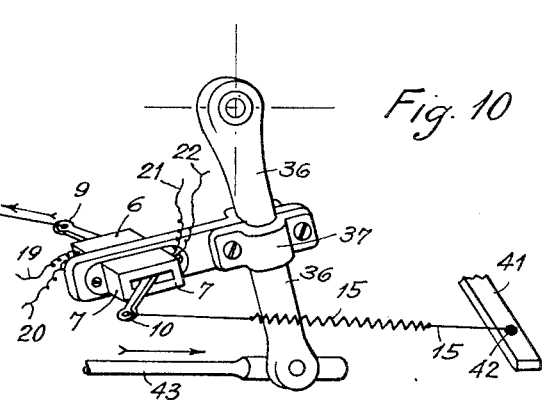

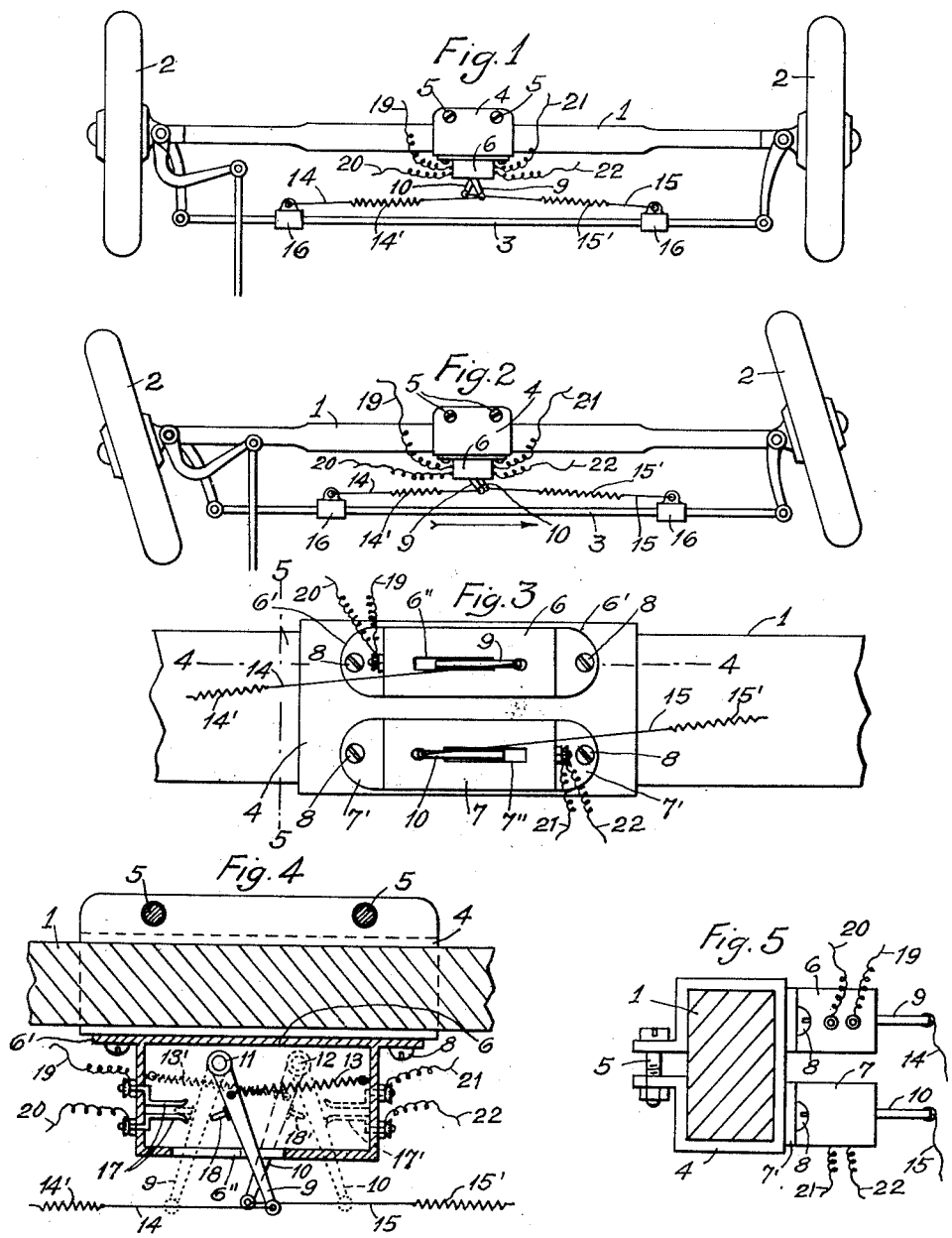

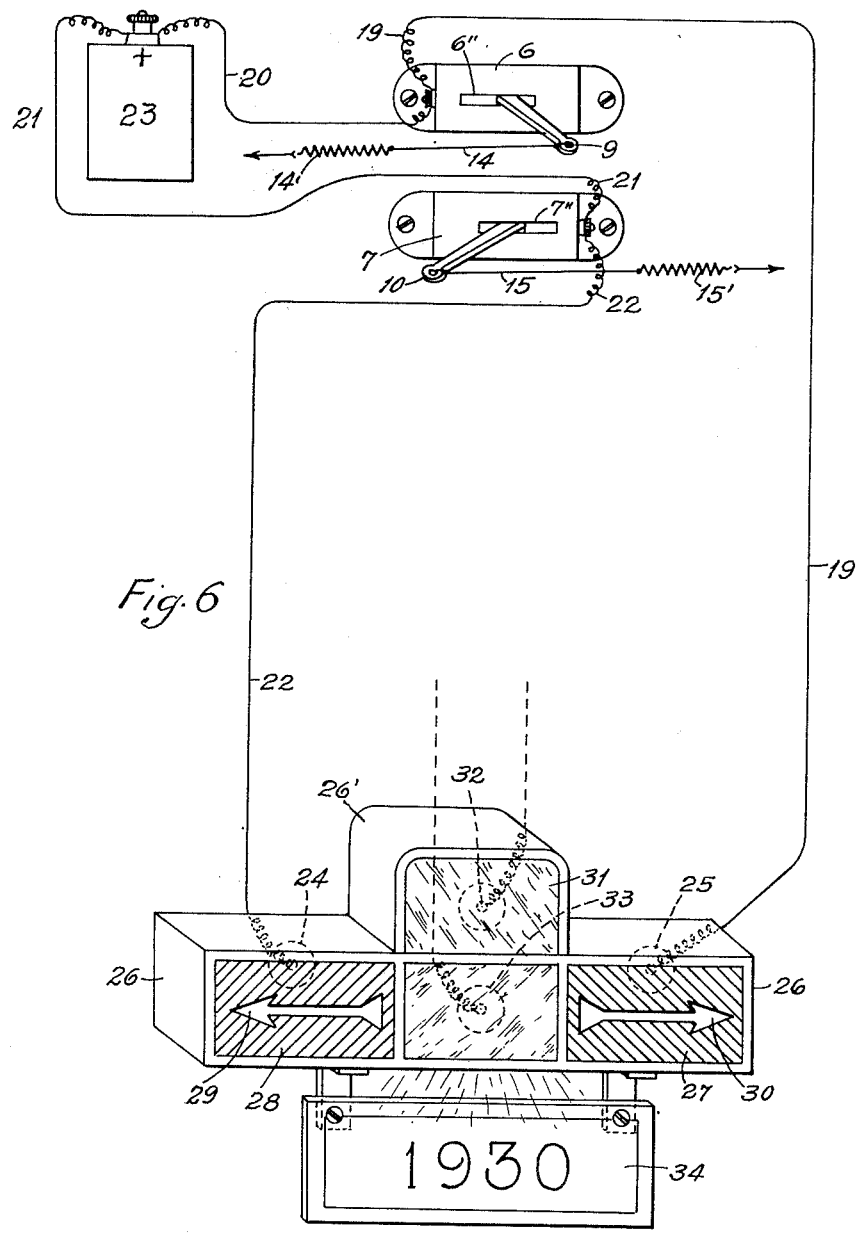

Patented Jan. 17, 1933

1,894,737

UNITED STATES PATENT OFFICE

ANDRES DEL VALLE Y DESVERNINE, OF HABANA, CUBA

SIGNALING DEVICE FOR VEHICLES

Application filed April 18, 1930, Serial No. 445,412, and in Cuba March 19, 1930.

This invention refers to signaling devices for vehicles, and especially for automobiles, and has for its main object the provision of an arrangement of electric circuits, in relation with lighting signals, which circuits are formed automatically when the vehicle turns to the right or to the left, without making it necessary for the driver to handle levers, buttons or other operative means, to operate the signal, which remains visible while the vehicle crosses to the right or to the left, the circuits also being broken automatically and the signal extinguished when the vehicle resumes a straight course.

Figure 1 is a fragmentary section upper plan view of the front axle of an automobile provided with the improvement object of this invention and in an inoperative position.

Figure 2 shows a like view in an operative position.

Figure 3 is a rear elevation on an enlarged scale and in detail of one part of the front axle of an automobile provided with the improvement object of the present invention.

Figure 4 is a vertical longitudinal section on an enlarged scale and in detail, according to line 4—4 of Fig. 3.

Figure 5 is a transversal section on an enlarged scale and in detail according to line 5—5 of Figure 3.

Figure 6 is a general diagrammatic view, with the parts in perspective, showing the improvement object of this invention.

Figure 7 shows a modified arrangement of the installation of the devices, shown as installed on the steering trunnion (pitman arm).

Figures 8, 9 and 10 are perspective views, in detail, of this modified form of the installation.

In the drawings, 1 designates the front axle, 2 the wheels, and 3 the steering bar of an automobile of any type.

To the axle 1 is secured a clamp 4 fastened there by means of bolts and nuts 5. On the inner side of said clamp, and in direct relation with same, although interspaced, are secured two casings 6 and 7 by means of screws 8, which are fastened to the lugs 6' and 7' projecting from said casings, which present respectively on its inner wall a lengthened slot 6" and 7" through which pass arms 9 and 10, said arms being pivoted on their inner ends to the respective casing by short shafts 11 and 12, and having attached to each one an end of a coil spring 13 and 13', the other end of which is attached to one of the side walls of the corresponding casing.

To the ends of the arms 9 and 10 which project through the slots 6" and 7" is attached the end of a cable 14 and 15 to which is connected a coil spring 14' and 15'. The opposite ends of these cables are secured by eyebolts with clamps 16 secured to the steering bar 3.

Within the casings 6 and 7 and in opposite position in each casing are two separate parallel contact stems 17 and in position to form contact with leaf 18 carried by each arm 9 and 10 as will be described hereinafter.

Each stem 17 is connected to a conductor 19—20—21—22, from which the conductors 20 and 21 are connected to a source of electricity 23 and the conductors 19 and 22 are connected to light signals 24 and 25 located within a closed metal casing 26, which is provided in front with metal plates 27 and 28 and having cut in same or formed in some way a direction signal arrow 29 and 30 behind which are placed colored glasses.

The central part of this casing presents on its upper part an arched projection 26' provided on its outer surface with a glass 31 and in which is installed the usual stop signal 32, and under this projection, in the center of the body of the casing 26 is installed the usual traffic light 33, which illuminates the license plate 34, which is fastened under the casing 26.

Said casing 26 is naturally placed in the rear part of the vehicle in a suitable position.

The operation of the devices described is as follows:

Assuming the automobile to be travelling in a straight course, then the parts will appear in the form shown in Fig. 1. The springs 14' and 15' will not be under tension and the contacts 18 of the arms 9 and 10 will be disconnected from the contact stems 17 (see Figure 4) opening thereby the circuits formed by the stems 17 of the casing 7, conductors 21 and 22, source of electricity 23 and signal 24, and stems 17 of the casing 6, conductors 19 and 20, source of electricity 23 and signal 25.

But, if as shown in Figure 2, the automobile turns to the left, then the steering bar 3 will assume the position to which it is forced by the movement of the steering wheel of the car, and the spring 15' will be under tension overcoming that of the counter-spring 13' forcing arm 10 to the position shown in dotted line in Figure 4 and thereby the contact 18 which is held by said arm will be forced between the corresponding stems 17', closing the circuit formed by the stems referred to, the source of electricity 23 and the signal 24, producing thereby the immediate lighting of same, while the vehicle is turning in said direction.

When the steering bar 3 assumes the position shown in Figure 1, that is, when the vehicle resumes travelling in a straight course, then the spring 15' will cease to be under tension, and by the tension of the spring 13', the arm 10 will reassume the position which is shown by straight line in Figure 4, thereby breaking the circuit formed by the stems 17', source of electricity 23 and the signal 24, extinguishing same automatically.

It is evident that when it is desired to turn to the right, the lighting of signal 25 is effected when the circuit is formed between the stems 17, source of electricity 23 and the signal 25; producing in the same way the extinguishing of same, when said circuit is broken and when the vehicle resumes its travel in a straight line and the steering bar assumes the position shown in Figure 1.

In Figures 7, 8, 9 and 10 is shown a modified embodiment of the signal operating devices, which in this case appear as carried by the steering trunnion or "pitman arm", instead of by the front axle and steering bar of the vehicle.

This arrangement is the equivalent to the afore described, as by same the effect of variations in direction during travel is greatly diminished and at the same time the devices are protected.

In this installation, 35 designates the shaft of the steering wheel, 36 the steering trunnion or "pitman arm" which is connected to bar 43, being secured by means of a brace 37 and screws on arm 38 presenting a slot through which is set one of the casings 7. The springs 14' and 15' being fastened on their opposite ends at 40 and 42, to parts of the frame 39 and 41 of the vehicle.

I claim:

An electric switch comprising a casing, a support for the casing, a clamp carried by the casing adapted to detachably engage the support, said casing having a slot in one wall thereof, a shaft within the casing, a switch arm pivotally connected to the shaft and swingable in the slot, said arm having a contact leaf thereon and disposed intermediate its ends, contact stems mounted in the casing, each stem having an offset extension adapted to be fixed in one wall of the casing, and conductors connecting the extensions and the source of electrical energy, a spring connecting the arm and casing and serving to normally hold the arm in its inoperative position, and means movable relative to the casing for swinging the arm against opposition of the spring to move the contact leaf into a position between the contact stems, as and for the purpose set forth.

In testimony whereof I affix my signature.

ANDRES del VALLE y DESVERNINE.